(12) United States Patent
Kocur et al.

(10) Patent No.: US 11,333,635 B2
(45) Date of Patent: May 17, 2022

(54) ROLLING SEARCH UNIT FOR ULTRASONIC RAILROAD RAIL INSPECTION

(71) Applicant: Sperry Rail Inc., Shelton, CT (US)

(72) Inventors: Jan Kocur, Shelton, CT (US); Anthony Iorfino, Bethel, CT (US); John James O'Neill, Danbury, CT (US)

(73) Assignee: Sperry Rail, Inc., Shelton, CT (US)

( * ) Notice: Subject to any disclaimer, the term of this patent is extended or adjusted under 35 U.S.C. 154(b) by 197 days.

(21) Appl. No.: 16/863,307

(22) Filed: Apr. 30, 2020

(65) Prior Publication Data

US 2021/0293758 A1    Sep. 23, 2021

Related U.S. Application Data

(60) Provisional application No. 62/990,805, filed on Mar. 17, 2020.

(51) Int. Cl.

| | | |
|---|---|---|
| *G01N 29/24* | (2006.01) | |
| *B61K 9/10* | (2006.01) | |
| *G01N 29/04* | (2006.01) | |
| *G01N 29/22* | (2006.01) | |
| *G01N 29/265* | (2006.01) | |
| *G01N 29/28* | (2006.01) | |

(52) U.S. Cl.
CPC .......... *G01N 29/2493* (2013.01); *B61K 9/10* (2013.01); *G01N 29/043* (2013.01); *G01N 29/225* (2013.01); *G01N 29/265* (2013.01); *G01N 29/28* (2013.01); *G01N 2291/0289* (2013.01); *G01N 2291/2623* (2013.01)

(58) Field of Classification Search
CPC .............. G01N 2291/2623; G01N 29/2493
See application file for complete search history.

(56) References Cited

U.S. PATENT DOCUMENTS

| | | | | |
|---|---|---|---|---|
| 5,386,727 A | * | 2/1995 | Searle ................ | G01N 29/2493 73/602 |
| 5,419,196 A | * | 5/1995 | Havira ................. | G01N 29/221 73/623 |
| 5,578,758 A | * | 11/1996 | Havira ................... | B30B 15/08 73/636 |
| 6,055,862 A | * | 5/2000 | Martens ............. | G01N 29/2493 73/632 |

(Continued)

OTHER PUBLICATIONS

Fluid Controls Ltd, How Pressure Regulators Work (Year: 2018).*

(Continued)

*Primary Examiner* — David L Singer
(74) *Attorney, Agent, or Firm* — McCormick, Paulding & Huber PLLC (57) ABSTRACT

A rolling search unit for ultrasonic inspection of railroad rails employs a wheel assembly including a fluid-filled tire that rolls along a rail with ultrasonic transducers that propagate ultrasonic beams through the fluid and tire into an underlying rail during an inspection operation. The beams reflected from defects in the rail return to the transducers and are detected and analyzed for subsequent care. The wheel assembly also includes an anti-rotation baffle to reduce rotation of the fluid with the tire and a pressure regulator for controlling the pressure of the fluid within the tire at various speeds.

27 Claims, 5 Drawing Sheets

(56) References Cited

U.S. PATENT DOCUMENTS

| | | | |
|---|---|---|---|
| 6,604,421 B1* | 8/2003 | Li | G01N 29/2493 73/636 |
| 7,849,748 B2 | 12/2010 | Havira | |
| 7,882,742 B1* | 2/2011 | Martens | G01N 29/265 73/636 |
| 8,739,631 B2 | 6/2014 | Havira et al. | |
| 2002/0065610 A1* | 5/2002 | Clark | B61D 15/00 702/35 |
| 2009/0282923 A1* | 11/2009 | Havira | G01N 29/2493 73/636 |
| 2013/0047730 A1* | 2/2013 | Wigh | B61K 9/10 73/636 |
| 2013/0220019 A1* | 8/2013 | Havira | G01N 29/2493 73/636 |
| 2014/0251015 A1 | 9/2014 | Havira et al. | |
| 2016/0304104 A1 | 10/2016 | Witte et al. | |
| 2017/0108473 A1 | 4/2017 | Bestebreutje | |
| 2019/0023286 A1 | 1/2019 | Kocur et al. | |

OTHER PUBLICATIONS

Trerice, What is a Pressure Regulator? (Year: 2001).*
Merriam Webster Dictionary, entry Regulating (Year: 2017).*
AZO Materials, The Significance of Selecting the Right Pressure Control (Year: 2016).*
International Search Report for PCT Application No. PCT/US2020/63223 dated Mar. 3, 2021.
Written Opinion for PCT Application No. PCT/US2020/63223 dated Mar. 3, 2021.

* cited by examiner

ROLLING SEARCH UNIT FOR ULTRASONIC RAILROAD RAIL INSPECTION

CROSS REFERENCE TO RELATED APPLICATIONS

This application is a non-provisional application that claims the benefit of U.S. Provisional Patent Application No. 62/990,805 filed Mar. 17, 2020, the contents of which are incorporated by reference herein in their entirety.

FIELD OF THE INVENTION

The present invention relates to improved apparatus and method for performing non-destructive testing and inspection of railroad rails. More particularly, the present invention is directed to a roller search unit (sometimes referred to as an RSU) and method for inspecting for and identifying defects in underlying railroad rails using ultrasonic transducers mounted within a wheel assembly having a fluid-filled tire. The fluid within the tires is an ultrasonic coupling fluid that transmits ultrasonic beams between the transducers and the tire. The beams penetrate the tire and the underlying rail, and are reflected back to the transducers from defects in the rail for analysis. In order to maximize signal strength of the ultrasonic beams transmitted back and forth between the transducers and tire, the coupling fluid must fully occupy the interior of the tire under all operating conditions.

BACKGROUND

From time to time, and for various reasons, the rails of a railroad track may develop one or more detrimental flaws or defects. Such flaws may include transverse defects, vertical shear or split-head defects, horizontal shear or split-head defects or the like that may originate from manufacturing and construction processes, environmental factors or wear-and-tear from normal use. These flaws or defects are typically observed in the head of a rail, but may also be found within the web and foot of the rail, around the peripheries of the bolt holes, or any other portion of the cross-section of the rail. Due to the nature of railway travel, in which locomotives weighing tens of thousands of pounds regularly carry hundreds of tons of freight over rails while traveling at varying speeds, cracks within the rails may expand or propagate throughout the rail over time. Such flaws or defects that are left unattended or unaddressed can lead to a variety of problems, the most serious of which may include catastrophic rail failures or train derailments, and may pose serious financial, health and safety risks to goods and personnel, as well as the railway industry as a whole.

Rail failures may be predicted and avoided through routine non-destructive inspection, which may enable railway operators to identify and cure hidden or infinitesimal flaws or defects within rails before they develop into problems of much greater magnitude. To detect such flaws or defects, vehicles or rail car-mounted rail inspection carriages including ultrasonic rail inspection equipment have been built to travel along a railroad track, and continuously perform ultrasonic inspection of the underlying rails in situ by transmitting ultrasonic beams into the rails and analyzing any portions of the beams that may be reflected off flaws or defects in the rail. One such rail inspection carriage is disclosed in US Published Patent Application 2019/0023286 of Kocur et al.

One example of the ultrasonic rail inspection equipment for in situ rail inspection including a wheel assembly having a fluid-filled tire for maintaining rolling contact with the head of an underlying rail is disclosed in U.S. Pat. No. 7,849,748 B2 to Havira. According to the teachings of Havira, the tire forms a contact patch with a head of an underlying rail and includes an ultrasonic transducer supported within the tire for projecting an ultrasonic beam along a beam axis through the fluid, the tire, a liquid couplant sprayed between the tire and rail, and into the head of the underlying rail. The couplant is normally a thin layer of a liquid, such as water or a mixture of water and other reagents, for improved contact between the tire and rail head. The ultrasonic beam propagates through the underlying rail and is reflected by any defects or flaws that may be present therein, which may cause some or all of the beam signals to be returned to the transducer or received by an ultrasonic detector. The reflected beam signals are then analyzed by one or more computer processors to determine the type, magnitude, and location of the flaw or defect from which the beam was reflected.

When an ultrasonic transducer is suspended within a fluid-filled tire, such as is disclosed in Havira, the tire and fluid provide the transmission medium between the ultrasonic transducer and the underlying rail. Due to the nature of sound propagation, the strength and quality of the ultrasonic waves that are both delivered and received by the transducer depend upon a continuous medium or mediums for transmission. Air pockets and other discontinuities in the mediums through which the ultrasonic beams are propagated destroy the beams and the signal information carried by the beams.

With slow speeds of travel during inspection operations, that is, less than 30 kph, the ultrasonic coupling fluid within the tire will generally maintain the necessary continuity of the medium with the tire for wave transmission. However, with higher speeds of travel sought in order to achieve shorter inspection times and less disruption to rail traffic, various problems develop.

Figure 1:
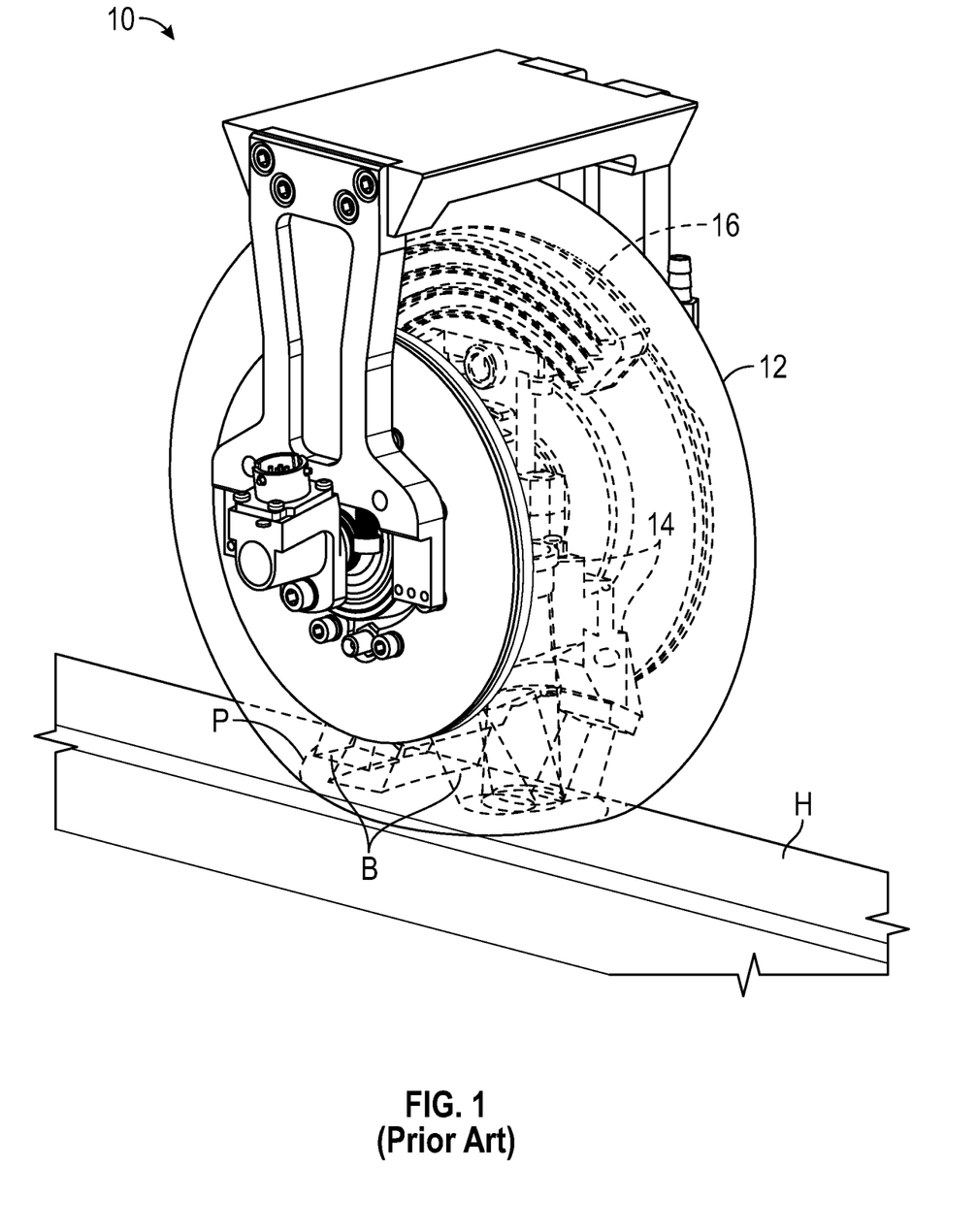
FIG. 1 is a perspective view from the field side of a rolling search unit according to the prior art on the head of a railroad rail while performing an ultrasonic inspection operation for defects in the rail.
Figure 2:
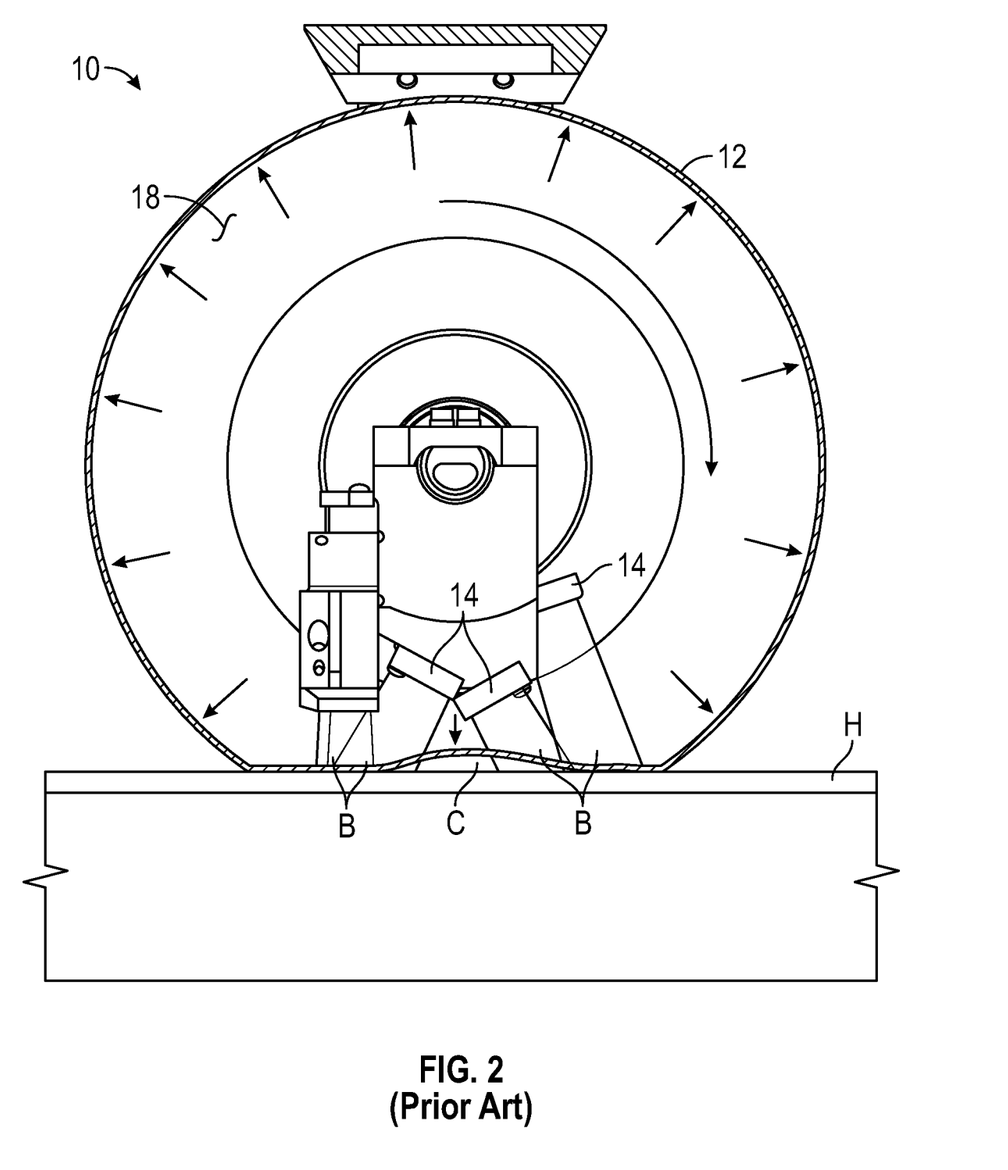
FIG. 2 is a cross sectional view transverse to the axis of rotation of the rolling search unit in FIG. 1.

FIG. 1 illustrates a rolling search unit 10 of the prior art having a wheel assembly with a tire 12 and components mounted within the tire, including ultrasonic transducers 14 and a heat exchanger 16 shown in phantom. As illustrated in FIG. 2, the tire is filled with a coupling fluid 18, such as a mixture of water and ethylene glycol, which serves as the medium for propagation of ultrasonic beams between the transducers 14 and the tire 12. The function and purpose of the heat exchanger 16 is to maintain the coupling fluid 18 at a uniform temperature as described in greater detail in U.S. Pat. No. 8,739,631 to Havira et al When the unit 10 is placed with a light load on a railhead H of an underlying rail to perform an inspection operation, the tire 12 is flattened slightly and forms a contact patch P with the rail head H. The tire 12 is made from a flexible membrane material, such as polyurethane, and is filled with the coupling fluid. Shear forces within the fluid and between the fluid and the tire cause the fluid to rotate with the tire. When travel speeds are increased, the rotating coupling fluid generates centrifugal forces which are exerted against the inner surface of the tire and stretch the tire. The stretching simultaneously increases the interior volume of the tire by finite amounts, and with a fixed volume of coupling fluid, the static pressure of the fluid inflating the tire is reduced. In FIG. 2 the arrows A illustrate the centrifugal forces of the coupling fluid 18 pressing outwardly against the tire 12 when the unit 10 is rotated as indicated by the arrow R.

It has also been noted that a phenomenon referred to as "cupping" C, that is, a pucker or lifting of the tire membrane away from the rail head at the center of the contact patch P of the tire with the rail head, accompanies the reduction in static pressure as travel speed is increased. The cupping C is also illustrated in FIG. 2. The cupping forms a pocket filled with a thicker layer of liquid couplant than desired and becomes a discontinuity of the medium in the path along which the ultrasonic beams B must pass between the transducers 14 and the rail head H. That discontinuity causes a distortion of the beam and reduction of the signal strength, and results in a loss of information sought by the inspection operation.

Another problem that arises with rolling inspection units of this type is the bouncing of ultrasonic beams within the tire 12 due to reflections from various surfaces within the tire. The bouncing beams can be picked up by a transducer the same as, or other than, the one from which the beam emanated, and can be misinterpreted as a defect where one does not exist.

Remedies for the problems discussed above are offered by the features of an improved rolling search unit and method for ultrasonically inspecting railroad rails as described below.

SUMMARY

The problems discussed above are addressed by an improved rolling search unit (hereafter RSU) for ultrasonic railroad rail inspection. The improved RSU comprises a wheel assembly having a tire filled with an ultrasonic coupling fluid. The wheel assembly is mounted by means of hubs for rotation on an axle for rolling contact of the tire with the head of an underlying rail of the railroad as the wheel assembly is translated along the rail during an inspection operation. The tire is made of a flexible membrane material, and forms a contact patch when placed on the head of the underlying rail during the inspection operation.

An ultrasonic transducer is supported on the axle within the tire for propagating an ultrasonic beam through the coupling fluid and the tire into the head of the underlying rail, and for receiving ultrasonic beams reflected back from defects encountered in the underlying rail. The reflected beams revealing the defect can then be further analyzed to establish the criticality of the defect and to decide if any remedial steps need to be taken.

A baffle is mounted in stationary relationship on the axle in the coupling fluid within the tire to suppress rotation of the coupling fluid with the tire when the tire rotates on the axle. By suppressing the rotation of the fluid, the centrifugal forces that would otherwise be generated by the rotating fluid and be exerted outwardly against the tire are considerably reduced. Therefore, the flexible membrane material forming the tire is not significantly stretched at greater speeds, and the interior volume of the tire occupied by the fluid is not substantially expanded. As a consequence, the loss of static pressure within the tire is reduced or may be eliminated.

With the baffle mounted on the axle and projecting from the axle into the coupling fluid, the baffle also intercepts stray ultrasonic beam reflections within the wheel assembly. By eliminating the stray reflections, the opportunity for the ultrasonic transducers to pick up the reflections and produce erroneous defect signals is also minimized.

A further improved rolling search unit (RSU) for ultrasonic railroad rail inspection comprises a wheel assembly having a tire filled with an ultrasonic coupling fluid. The wheel assembly is mounted for rotation on an axle for rolling contact of the tire with the head of an underlying rail of the railroad. The tire is made of a flexible membrane material, and forms a contact patch when the tire is placed on the head of the underlying rail during an inspection operation.

An ultrasonic transducer is supported on the axle within the tire and generates an ultrasonic beam that is propagated through the coupling fluid and the tire into the head of the underlying rail. The transducer also receives ultrasonic waves reflected back from defects in the underlying rail for analysis.

The further improved RSU includes a pressure regulator for regulating the pressure of the coupling fluid within the wheel assembly during an inspection operation. The pressure regulator includes a pressurizing component mounted in the coupling fluid within the wheel assembly for pressurizing the coupling fluid within the tire. In one embodiment the pressurizing component is a pressurizing bladder.

With the pressurizing bladder, the expanded volume of the tire caused by stretching of the membrane material at higher speeds is supplemented with coupling fluid to keep the tire filled, to maintain or increase pressure within the tire, and to eliminate "cupping" by pressing the tire against the rail head and squeezing out the thicker layer of liquid couplant between the tire and rail head, and other degrading effects arising at the higher inspection speeds.

Increased inspection speeds increase the centrifugal forces and stretching of the tire which further amplify the degrading effects on signal strength of the ultrasonic waves passing through the couplant at the contact patch, the tire and the coupling fluid. Consequently, the pressure regulator may include a speed sensor that detects inspection speeds and increases the regulated pressure of the coupling fluid within the tire as a function of the inspection speed.

An improved method for inspecting railroad rail ultrasonically is also provided by the present invention. The method includes the step of providing a wheel assembly having a tire filled with an ultrasonic coupling fluid and mounted for rotation on an axle for rolling contact with a head of an underlying rail of the railroad. The tire is made of a flexible membrane material, whereby the tire forms a contact patch when placed on the head of the underlying rail during an inspection operation.

An ultrasonic transducer is placed within the tire for propagating an ultrasonic beam through the coupling fluid and the tire into the head of the underlying rail, and for receiving ultrasonic waves reflected back from defects in the underlying rail. While rolling the wheel assembly along a railroad rail with the tire in contact with the head of the rail, the transducer is activated in an inspection operation.

In accordance with the invention, the ultrasonic coupling fluid within the tire is pressurized at a regulated pressure during the inspection operation to overcome the problems referenced above in conducting inspections at higher speeds. The regulated pressure may be increased as a function of the inspection speed.

Further features and advantages of an improved rolling search unit and the method of conducting ultrasonic inspections of railroad rails can be derived from the following description.

DESCRIPTION OF THE PREFERRED EMBODIMENTS

FIGS. 1 and 2 illustrate a rolling search unit 10 of the prior art to illustrate the problems addressed by the improved rolling search unit as discussed above. FIGS. 3-6 illustrate the improved rolling search unit 20 (RSU) which incorporates the features of the present invention. The RSU 20 has all of the features of the prior art unit 10. The RSU 20 includes a wheel assembly 22 having a tire 12 filled with a coupling fluid 18 and a plurality of ultrasonic transducers 14 immersed in the fluid. The transducers generate ultrasonic beams B aimed in various downward directions to propagate through the fluid 18 and the tire 12 into the railhead H of an underlying rail in an inspection operation.

When the ultrasonic beams B encounter a defect in the railhead or deeper in the rail they are reflected back through the rail, the tire 12, and the coupling fluid 18 to the transducers where the signal information carried by the reflected beams is captured and analyzed. The analyzed information can provide details regarding the type of defect, the size of the defect, and its location relative to the RSU.

Figure 3:
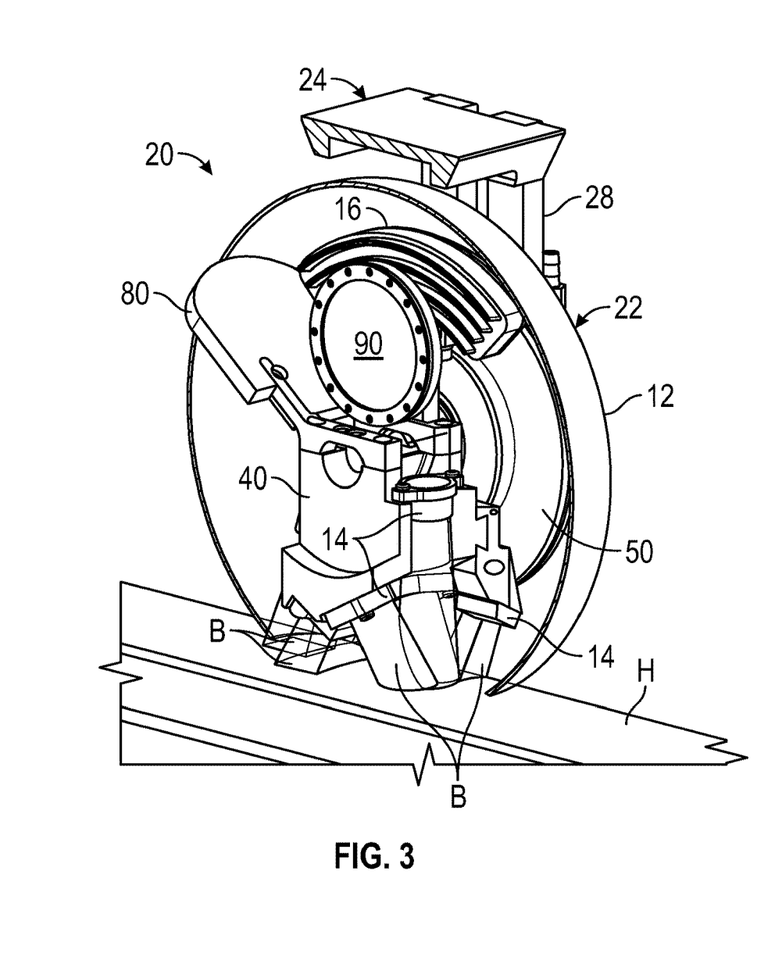
FIG. 3 is a perspective view of a rolling search unit in cross section with the field side portion of the unit cut away to show an anti-rotation baffle and a pressurizing bladder according to the present invention.
Figure 4:
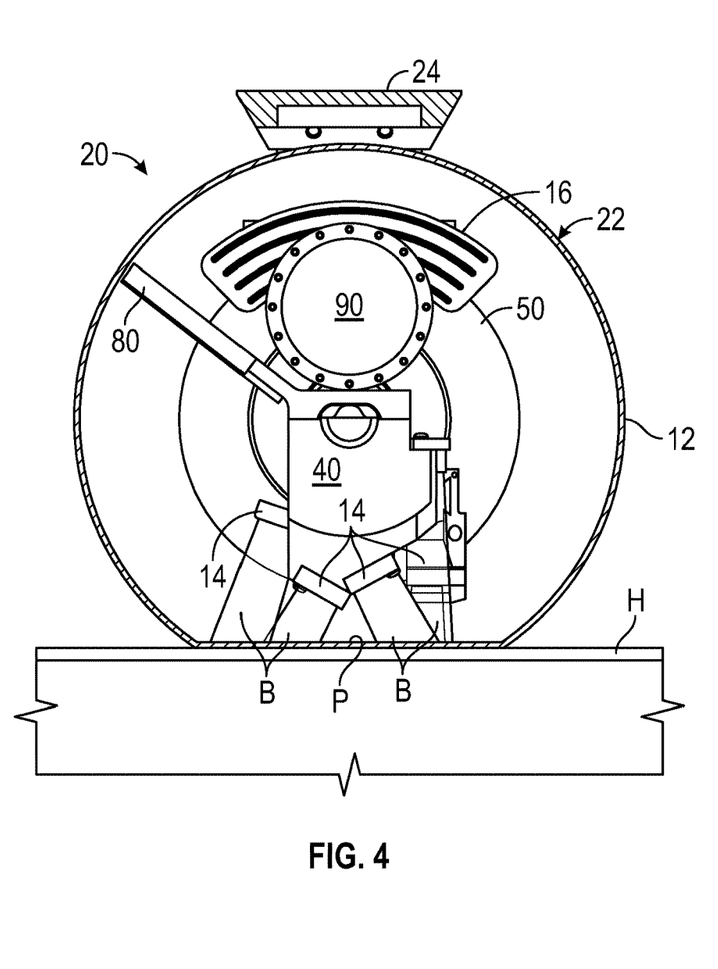
FIG. 4 is a cross sectional view transverse to the axis of rotation of the rolling search unit with the field side of the unit removed as in FIG. 3.
Figure 5:
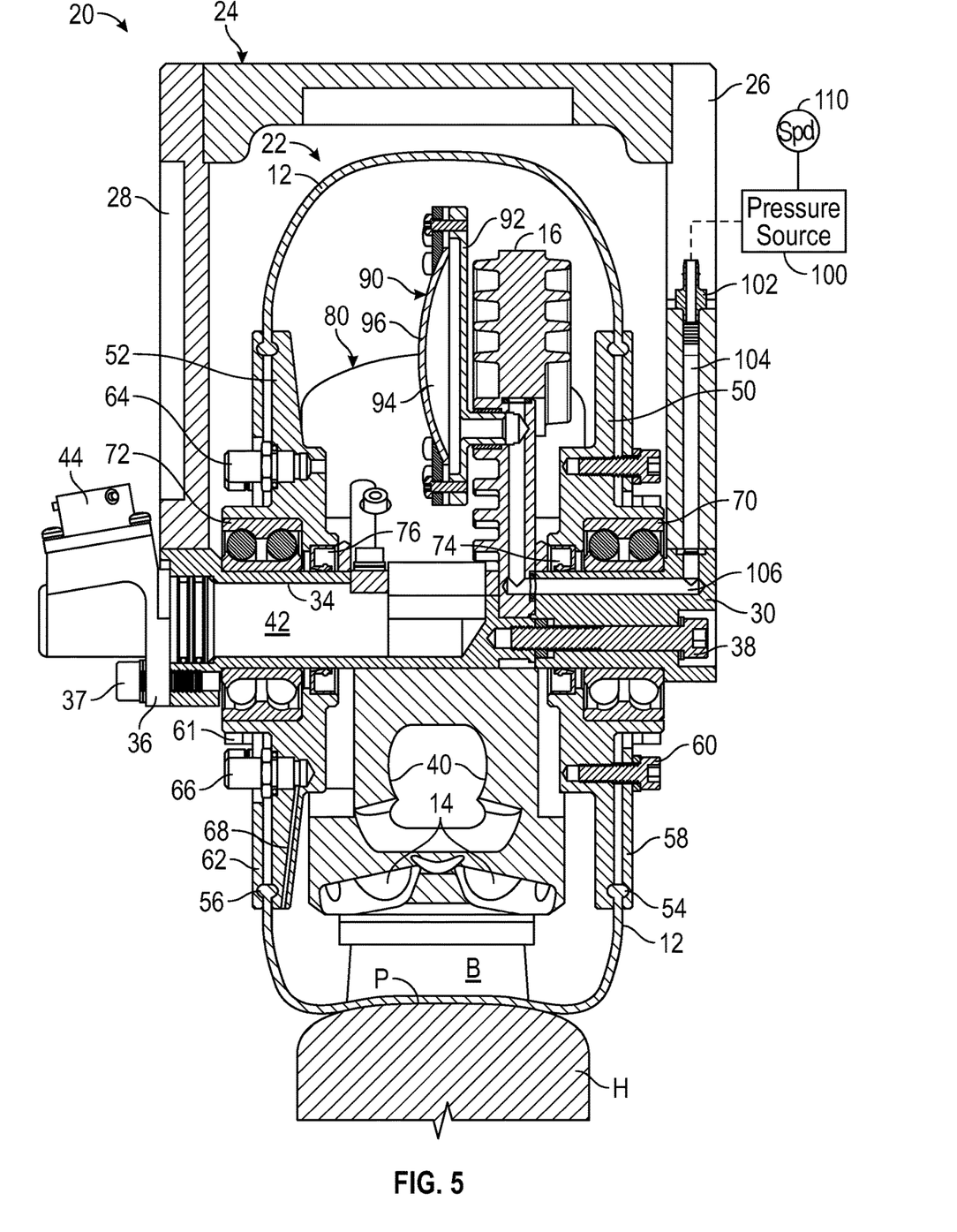
FIG. 5 is a cross sectional view along the axis of rotation of the rolling search unit in FIG. 3.
Figure 6:
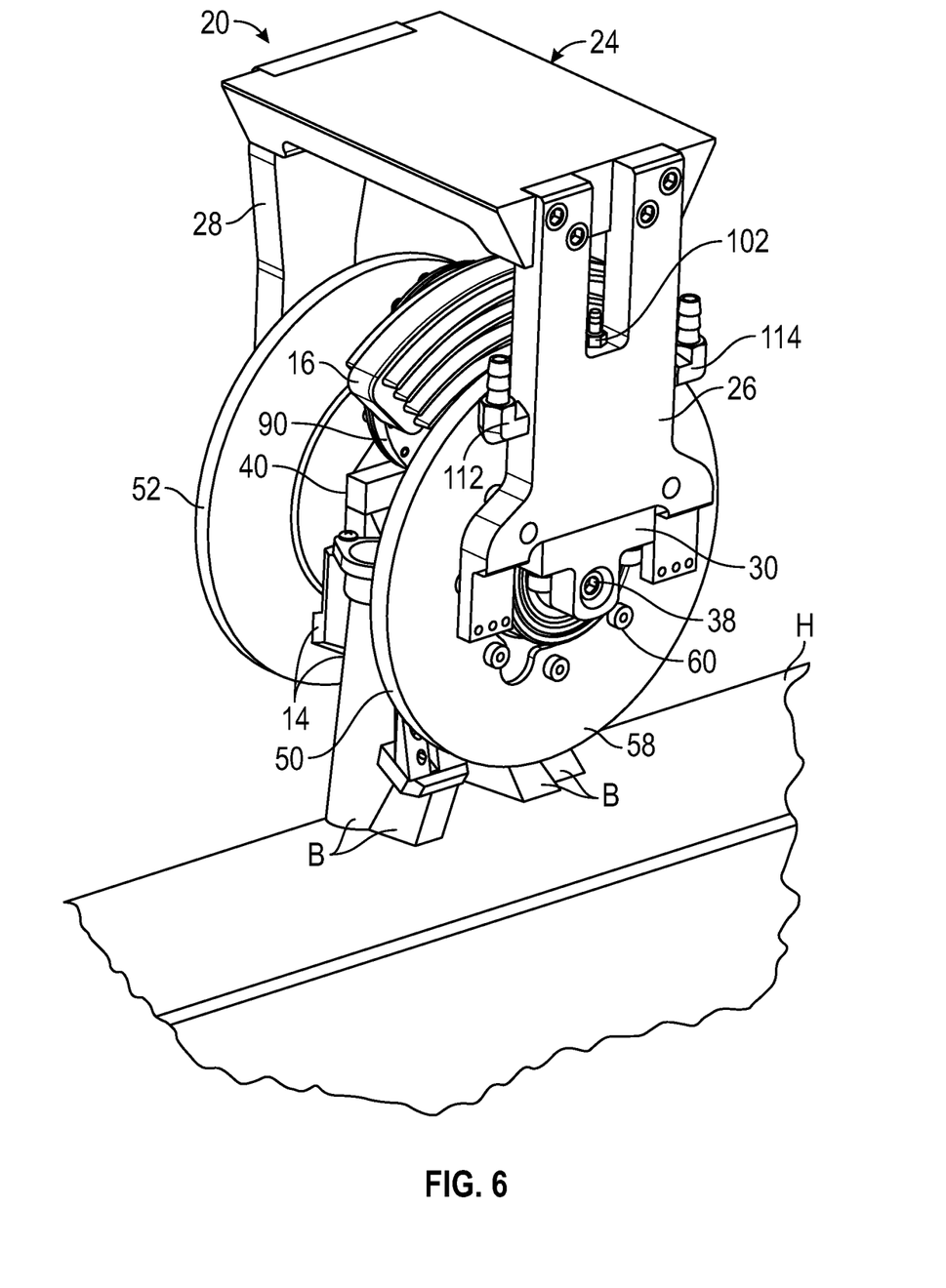
FIG. 6 is a perspective view from the gauge side of the rolling search unit in FIG. 3 with the tire removed from the wheel hubs.

The wheel assembly 22 as shown most clearly in FIGS. 3-6 is supported in a frame 24 with a leg 26 at the gauge side and a leg 28 at the field side, so that the legs straddle the wheel assembly. A stub axle 30 is connected to the gauge side leg 26 of the frame 24 as shown in FIG. 6. Another stub axle 34 is similarly connected to the field side leg 28 of the frame. The stub axles 30, 34 are joined to each other at their inner ends by a bolt 38 shown in FIG. 5. The stub axle 30 supports a number of components described hereafter within the tire 12 in stationary relationship with the frame 24. A floating axle 42 shown in FIG. 5 is installed within the stub axle 34 and is connected through a cutaway section of the stub axle with a yoke 40 on which the transducers 14 are mounted. The floating axle projects out of the field side of the stub axle 34 and has a slotted flange 36 with a clamping screw 37 for trimming the mounting angle of the transducers by rotating the floating axle 42 within the stub axle 34 and then tightening the clamping screw 37 to fix the floating axle within the stub axle. With the floating axle clamped with the stub axle 34, the stub axles 30, 34 and the floating axle 42 are all fixed in stationary relationship to the frame 24. The axles and yoke are non-rotating and serve as a stationary mount for all of the internal components of the wheel assembly 22 including the transducers 14 and the heat exchanger 16.

An electrical plug 44 is connected to the field side end of the stub axle 34 and provides electrical connections for the transducers 14 within the wheel assembly 22.

It will be understood that the frame 24 with the wheel assembly 22, and typically multiple other similar wheel assemblies, are suspended from a rail inspection carriage such as disclosed in US Published Patent Application 2019/0023286 during an inspection operation. The carriage is in turn suspended under a rail car or rail-mounted vehicle for traveling along the rails of a railroad and conducting an inspection of the rails in situ. The wheel assemblies are lowered into contact with the railheads H with a limited downward force that causes the tires of the wheel assemblies to flatten slightly, as shown most clearly in FIG. 5, and forms the contact patch P of FIGS. 1 and 2. The contact patch is large enough to provide for favorable transmission of all the ultrasonic beams B penetrating the railhead from the tire.

As shown in FIG. 5, the wheel assembly 22 includes a wheel hub 50 on which the tire 12 is mounted at the gauge side, and hub 52 on which the tire 12 is mounted on the field side. The tire 12 is a flexible membrane material, such as polyurethane, that has been molded into the toroidal configuration with beads 54, 56 respectively at each circular edge. The hubs are provided with corresponding grooves for the beads. An annular clamping plate 58 with a groove matching the bead 54 clamps the bead against the wheel hub 50 in fluid-tight relationship by means of cap screws 60. A similar clamping plate 62 with a groove matching the bead 56 clamps the bead against the wheel hub 52 in fluid-tight relationship by means of similar cap screws 61. Together, the hubs 50, 52, beads 54, 56, and clamping plates 58, 62 form a sealed connection between the tire 12 and hubs that prevents the coupling fluid 18 under pressure from escaping from the tire.

To fill the tire with coupling fluid a fill valve 64 is provided in the field side hub 52. The fill valve is a self-closing valve such as a Schrader valve. To bleed air from the tire 12 when being filled with coupling fluid, the field side hub 52 has a bleed valve 66 and a bleed port 68 leading from the valve to the interior of the tire. The bleed valve is a manually operated valve to open and close the port for bleeding air from the tire.

As shown in FIG. 5, to rotate the wheel assembly 22 in the frame 24 with the tire 12 against a railhead H during an inspection operation, the hub 50 is mounted on the stub axle 30 by means of roller bearing 70, and the hub 52 is mounted on the stub axle 34 by means of roller bearing 72. A shaft seal 74 is installed in the hub 50 to prevent coupling fluid from escaping through the bearing 70. A similar shaft seal 76 is installed in the hub 52 to prevent coupling fluid from escaping through the bearing 72. Other seals are provided at various joints between the bolts, valves, and axles to ensure that the coupling fluid 18 does not escape from the tire 12.

As previously indicated in connection with FIG. 2, shear forces between the tire and coupling fluid 18 when the tire 12 rotates cause the fluid to rotate with the tire. The forces create centrifugal forces against the tire and stretch the tire by finite amounts. With a fixed volume of fluid, the static pressure of the fluid within the tire, typically 5-8 psi, will drop and risk the cupping C phenomenon, cavitation, and foaming within the tire, all of which interfere with the transmission of the ultrasonic beams B.

To suppress the rotation of the coupling fluid with the tire and the associated centrifugal forces, an anti-rotation baffle 80 shown in FIGS. 3-5 is supported in stationary relationship within the tire on the yoke 40 as seen most clearly in FIGS. 3 and 4. The baffle 80 projects radially outwardly from the axles toward the tire and has a shape that will generally obstruct the rotation of the coupling fluid with the tire. However, the baffle maintains a spaced relationship with the interior surface of the tire so that the baffle does not interfere with the rotation of the tire. By means of the baffle 80 and the obstruction of the coupling fluid, the centrifugal forces of the fluid on the tire are considerably reduced along with the associated loss of static pressure within the tire. Hence the cupping phenomenon is suppressed and a continuous medium for transmission of the ultrasonic beams between the transducers and the railhead is maintained.

The anti-rotation baffle 80 illustrated is flat, but curved and other shapes may also be employed to obtain the desired resistance to fluid rotation and maintain a spaced relationship with the interior of the tire 12. The shape of the baffle may also accommodate other components within the tire. Additionally, more than one baffle may be employed at different locations within the tire to suppress the fluid rotation.

In addition to preventing coupling fluid rotation, the anti-rotation baffle 80 also serves the purpose of intercepting and dissipating unwanted ultrasonic beam reflections within the tire. The baffle or baffles may be strategically shaped, positioned, and provided with a surface texture to accomplish the beam intercepting and dissipating functions.

To further improve the continuity of the fluid medium through which the ultrasonic beams B pass between the transducers 14 and the tire 12, the RSU 20 has a pressure regulator for controlling the pressure of the coupling fluid 18 in the wheel assembly during an inspection operation. The pressure regulator includes a component 90 within the tire 12 and a regulated pressure source 100 outside of the wheel assembly on the frame 24 or elsewhere. As illustrated in FIGS. 3-6 the component 90 is a pressurizing bladder mounted on the stub axle 30 within the tire. As shown most clearly in FIG. 5, the pressurizing bladder 90 has a housing 92 defining a pressure chamber 94 closed by a flexible diaphragm 96. The pressurizing bladder is preferably an air bladder supplied with pressurized air from the regulated pressure source 100 outside of the tire. When pressurized air is delivered to the bladder 90, the diaphragm 96 expands into the interior space of the tire occupied by the coupling fluid and pressurizes the fluid.

The regulated pressure source 100 in one embodiment is an air compressor that provides regulated air pressure. As shown most clearly in FIG. 5, the pressurized air source 100 is connected to a fitting 102 on the gauge-side frame leg 26, and supplies regulated air pressure from outside the wheel assembly 22 to the pressurizing bladder 90 within the wheel assembly through a drilled channel 104 in the frame leg 26, and a manifold 106 formed in the stub axle 30.

Fittings 112, 114 are used to feed a heating/cooling fluid through the heat exchanger 16 by means of similar but separate channels and manifolds in the stub axle 30. The heating or cooling is desirable to hold the temperature of the coupling fluid through which the ultrasonic beams B pass at a fixed level for standardized results since inspection of the rails is conducted in situ and may be performed in all seasons.

When the wheel assembly 22 is not in motion, the static pressure of the coupling fluid in the tire 12 is nominal, for example, 5-8 psi. The regulated pressure supplied from the pressure source 100 would be the same. However, when the wheel assembly is moving and centrifugal pressure of the rotating fluid causes the tire to stretch at higher inspection speeds, the pressure source 100 supplies increased air pressure to the pressurizing bladder 90 and expands the flexible diaphragm 96 against the fluid within the tire.

For this purpose the regulated pressure source 100 receives a speed signal from a speed sensor 110 shown in FIG. 5, which signal regulates the air pressure supplied by the source as a function of speed. The speed sensor 110 may be responsive to either the rotational speed of the wheel assembly 22 or the translational speed of the wheel assembly along the rail being inspected. In general the speed signal increases the regulated air pressure delivered by the pressure source with increased speeds.

In this manner, the pressure regulator formed by the pressurizing bladder 90 and regulated pressure source 100 maintains or increases the pressure in the tire to compensate for the finite increase in volume of the stretched tire and the otherwise associated reduction of pressure in the tire. Correspondingly, the increased pressure at higher speeds presses the tire 12 against the rail head H and eliminates the cupping effect and the thicker layer of liquid couplant that would otherwise diminish the strength of the ultrasonic beams B and their reflections passing through the contact patch P.

While the present invention has been described in several embodiments, it will be understood that numerous modifications can be made without departing from the spirit of the invention. For example, although the anti-rotation baffle 80 is intended to prevent the coupling fluid from rotating with the tire 12, some of the fluid will pass by the baffle in view of the spaced relationship of the baffle and tire and could produce centrifugal forces expanding the tire. Therefore, it is advantageous to use both the baffle 80 and the pressurizing bladder 90 in the wheel assembly together.

The internal component of the pressure regulator disclosed as the pressurizing bladder 90 and the regulated pressure source 100 can take various forms. The pressurizing component formed by the pressurizing baffle 90 may take the form of other expandable devices, such as a bellows, or a piston within or emerging from a cylinder for displacing or replacing fluid within the tire. The pressure source may also supply a pressurized liquid at a regulated pressure to activate the pressurizing component of the pressure regulator.

Accordingly, the present invention has been described in several embodiments by way of illustration rather than limitation.

What we claim is:

1. A rolling search unit for ultrasonic railroad rail inspection comprising:
   a wheel assembly having a tire filled with an ultrasonic coupling fluid and rotatably mounted on an axle for rolling contact with a head of an underlying rail of the railroad, the tire being made of a flexible membrane material, whereby the tire forms a contact patch when placed on the head of the underlying rail during an inspection operation;
   an ultrasonic transducer supported on the axle within the tire for propagating an ultrasonic beam through the coupling fluid and the tire into the head of the underlying rail, and for receiving ultrasonic beams reflected back from defects detected in the underlying rail; and
   a baffle mounted in stationary relationship on the axle in the coupling fluid within the tire to suppress rotation of the coupling fluid with the tire when the tire rotates on the axle.

2. A rolling search unit for ultrasonic railroad rail inspection as defined in claim 1 wherein the baffle is mounted on the axle to project into the coupling fluid and intercept ultrasonic wave reflections within the wheel assembly.

3. A rolling search unit for ultrasonic railroad rail inspection as defined in claim 1 wherein the baffle projects into the coupling fluid in spaced relationship with the interior of the tire.

4. A rolling search unit for ultrasonic railroad rail inspection as defined in claim 1 wherein the baffle projects into the coupling fluid and has a shape providing space relationship with the interior of the tire.

5. A rolling search unit for ultrasonic railroad rail inspection comprising:
- a wheel assembly having a tire filled with an ultrasonic coupling fluid and mounted for rotation on an axle for rolling contact with a head of an underlying rail of the railroad, the tire being made of a flexible membrane material, whereby the tire forms a contact patch when placed on the head of the underlying rail during an inspection operation;
- an ultrasonic transducer supported on the axle within the tire for propagating an ultrasonic beam through the coupling fluid and the tire into the head of the underlying rail, and for receiving ultrasonic waves reflected back from defects in the underlying rail; and
- a pressure regulator for regulating the pressure of the coupling fluid within the wheel assembly during an inspection operation.

6. A rolling search unit for ultrasonic railroad rail inspection as defined in claim 5 wherein the pressure regulator includes a pressurizing component mounted in the coupling fluid within the tire of the wheel assembly.

7. A rolling search unit for ultrasonic railroad rail inspection as defined in claim 6 wherein the pressurizing component is a pressurizing bladder.

8. A rolling search unit for ultrasonic railroad rail inspection as defined in claim 6 wherein the pressurizing component is mounted on the axle within the tire, and the axle serves as a manifold with passageways leading from the exterior of the rolling search unit to the pressurizing component within the tire for supplying a pressurizing fluid to the component.

9. A rolling search unit for ultrasonic railroad rail inspection as defined in claim 6 wherein the pressure regulator further includes a source of fluid at a regulated pressure outside the wheel assembly connected with the pressurizing component within the wheel assembly for pressurizing the coupling fluid within the wheel assembly at a selected pressure level established by the source.

10. A rolling search unit for ultrasonic railroad rail inspection as defined in claim 9 wherein the source of fluid provides fluid to the pressurizing component at a regulated pressure that is variable.

11. A rolling search unit for ultrasonic railroad rail inspection as defined in claim 10 wherein the source of fluid at a regulated pressure includes a speed sensor detecting the speed of the rolling search unit during an inspection operation, and the source regulates the fluid pressure pressurizing the pressurizing component as a function of the detected speed.

12. A rolling search unit for ultrasonic railroad rail inspection as defined in claim 11 wherein the source of fluid at a regulated pressure increases the regulated pressure with increases in the speed detected by the speed sensor.

13. A rolling search unit for ultrasonic railroad rail inspection as defined in claim 10 wherein the speed sensor detects the rotational speed of the wheel assembly.

14. A rolling search unit for ultrasonic railroad rail inspection as defined in claim 10 wherein the speed sensor detects the translational speed of the wheel assembly.

15. A rolling search unit for ultrasonic railroad rail inspection comprising:
- a wheel assembly having a tire filled with an ultrasonic coupling fluid and rotatably mounted on an axle for rolling contact with a head of an underlying rail of the railroad, the tire being made of a flexible membrane material, whereby the tire forms a contact patch when placed on the head of the underlying rail during an inspection operation;
- an ultrasonic transducer supported on the axle within the tire for propagating an ultrasonic beam through the coupling fluid and the tire into the head of the underlying rail, and for receiving ultrasonic beams reflected back from defects in the underlying rail;
- a baffle mounted in stationary relationship on the axle in the coupling fluid within the tire to suppress rotation of the coupling fluid with the tire when the tire rotates on the axle; and
- a pressure regulator for pressurizing the coupling fluid within the tire in the wheel assembly.

16. A rolling search unit for ultrasonic railroad rail inspection as defined in claim 15 wherein the baffle is mounted on the axle to project into the coupling fluid and intercept ultrasonic wave reflections within the wheel assembly.

17. A rolling search unit for ultrasonic railroad rail inspection as defined in claim 15 wherein the baffle projects into the coupling fluid in spaced relationship with the interior of the tire.

18. A rolling search unit for ultrasonic railroad rail inspection as defined in claim 15 wherein the baffle projects into the coupling fluid and has a shape providing a spaced relationship with the interior of the tire.

19. A rolling search unit for ultrasonic railroad rail inspection as defined in claim 15 wherein the pressure regulator includes a pressurizing component mounted within the tire of the wheel assembly and supplied with a pressurizing fluid from outside the wheel assembly.

20. A rolling search unit for ultrasonic railroad rail inspection as defined in claim 19 wherein the pressurizing component is mounted on the axle of the wheel assembly within the tire, and the axle comprises a manifold supplying the pressurizing fluid to the component.

21. A rolling search unit for ultrasonic railroad rail inspection as defined in claim 19 wherein the pressurizing component is a pressurizing bladder.

22. A method for inspecting railroad rail ultrasonically comprising the steps of:
- providing a wheel assembly having a tire filled with an ultrasonic coupling fluid and mounted for rotation on an axle for rolling contact with a head of an underlying rail of the railroad, the tire being made of a flexible membrane material, whereby the tire forms a contact patch when placed on the head of the underlying rail during an inspection operation;
- placing an ultrasonic transducer within the tire for propagating an ultrasonic beam through the coupling fluid and the tire into the head of the underlying rail, and for receiving ultrasonic waves reflected back from defects in the underlying rail;
- rolling the wheel assembly along a railroad rail with the tire in contact with the head of the rail while the transducer is activated in an inspection operation; and
- pressurizing the ultrasonic coupling fluid within the tire to a regulated pressure during the inspection operation utilizing a pressurizing component.

23. A method for inspecting railroad rail ultrasonically as defined in claim 22 wherein the pressurizing of the ultrasonic coupling fluid is regulated as function of the translational speed of the wheel assembly along the railroad rail.

24. A method for inspecting railroad rail ultrasonically as defined in claim 22 wherein the pressurizing of the ultrasonic coupling fluid is regulated as function of the rotational speed of the wheel assembly while rolling along the railroad rail.

25. A method for inspecting railroad rail ultrasonically as defined in claim 22 wherein the pressurizing of the ultrasonic coupling fluid is regulated as function of the speed of the wheel assembly along the railroad rail with pressure being increased with increases in speed.

26. A method for inspecting railroad rail ultrasonically as defined in claim 22 wherein the pressurizing component is mounted within the wheel assembly.

27. A method for inspecting railroad rail ultrasonically as defined in claim 26 wherein the pressurizing component is a bladder.

* * * * *